March 24, 1964 J. J. PARISER ETAL 3,126,476
BINARY RATE MULTIPLIER
Filed March 31, 1959 2 Sheets-Sheet 1
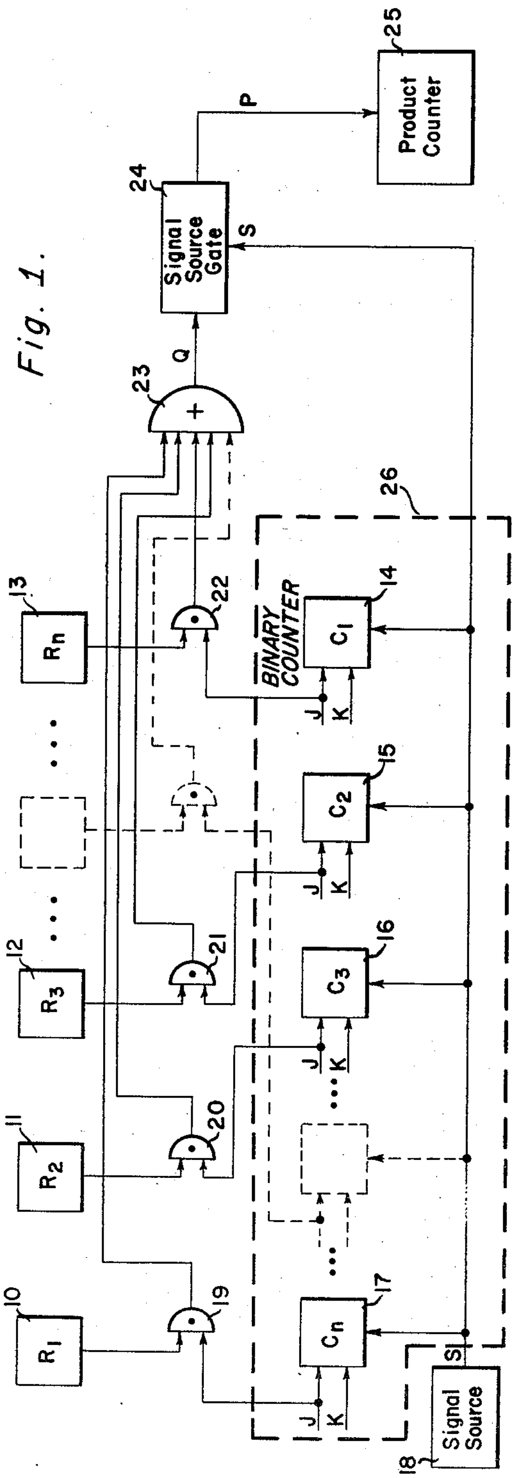
Fig. 3.
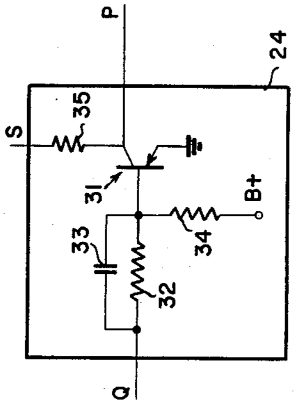
Jack J. Pariser,
Andrew M. Jusko,
INVENTORS.

BINARY RATE MULTIPLIER

Filed March 31, 1959 2 Sheets-Sheet 2

Jack J. Pariser,
Andrew M. Jusko,
*INVENTORS.*

3,126,476
BINARY RATE MULTIPLIER
Jack J. Pariser, Anaheim, and Andrew M. Jusko, Beverly Hills, Calif., assignors to Hughes Aircraft Company, Culver City, Calif., a corporation of Delaware
Filed Mar. 31, 1959, Ser. No. 803,171
6 Claims. (Cl. 235—164)

This invention relates generally to electronic digital computers, and more particularly to apparatus for providing a continuous product of two numbers in which the multiplier is a binary number represented by the state of a static register and the multiplicand is the number of pulses in a time sequence of pulses.

This type of multiplication is well-known in the digital computer art as "rate multiplication" and is described in an article entitled "Adapting Digital Techniques for Automatic Controls—I" in Electrical Manufacturing, November 1954, at pages 140–142. Rate multiplication has been applied to a number of problems such as occur in certain radar systems.

Rate multiplication, as generally practiced, and as taught in the above mentioned article, will be briefly described below.

The multiplier of the product is represented by the states of a number of storage elements forming a static register and the multiplicand is the number of pulses occurring in a time sequence. The rate multiplication operation requires a plurality of scalars for receiving the electrical pulses occurring in a train. A first scalar provides an output pulse for each two input pulses received by it; a second scalar provides an output pulse for each four input pulses received by it; a third scalar provides an output pulse for each eight input pulses received by it, etc. Thus, we have a first source of pulses providing half the number of input pulses; a second source providing one-fourth the number of input pulses; a third source providing one-eighth the number of input pulses, etc. The desired product is produced by combining the outputs of the appropriate scalars under the control of the digits of the multiplier. If the number (the multiplier) in the static register is so scaled that it lies between decimal 0 and 1, then the binary point occurs before the most significant digit of the static register. Thus, the most significant digit of the static register has a value of one-half; the next most significant digit has a value of one-fourth; the third most significant digit has a value of one-eighth, etc. The presence of a 1 in the most significant digit of the static register permits the passage of pulses from the first scalar; the presence of a 1 in the next most significant digit of the static register permits the passage of pulses from the second scalar, etc. All of the pulses passed from the scalars are then added. The sum so produced is the product of the number of input pulses and the number in the static register.

As an example, let the total number of pulses be 400. If it is desired to multiply this by $^{13}/_{16}$, we must place the multiplier ($^{13}/_{16}$) in a static register. The binary representation of this fraction would be .1101. As has been stated, the presence of a 1 in the most significant digit of the register permits the passage of pulses from the first scalar which, in this case, would pass 200 pulses. The presence of a 1 in the next most significant digit permits the passage of 100 pulses from the second scalar. The presence of a 0 in the third most significant digit of the multiplier inhibits the passage of pulses from the third scalar, and the presence of a 1 in the least significant digit permits the passage of 25 pulses from the fourth scalar. We have thus passed a total of $200+100+25=325$ pulses which is the product of $^{13}/_{16}\times 400$.

In the prior art rate multiplier, a train of electrical pulses is received by a binary counter which contains a set of flip-flops which are, in combination with other circuitry, adapted to function as the scalars described above. Each of the digits in the counter is combined with a digit of the static register so that an output pulse can only result when the corresponding register digit contains a 1. However, since each counter digit is usually represented by the state of a flip-flop, a D.C. (direct-current) voltage, the voltage states of these flip-flops must be reconverted into pulses. This has been accomplished by differentiating the output of each counter digit flip-flop, combining the differentiated outputs in an "or" gate, which produces as its output a number of pulses equal to the sum of all the pulses received by it, and applying the output of the "or" gate to a product counter which stores the desired product. The binary counter must be so designed that no two flip-flops change state such that more than one pulse occurs simultaneously. The simultaneous occurrence of more than one pulse at the input to an "or" gate will result in an error since an "or" gate will only pass one pulse at any time regardless of the number of input pulses.

There are disadvantages, however, in the operation of the circuit described above. For example, the output of each counter flip-flop must be differentiated and this differentiation must occur before combining the outputs of the scalars to obtain a composite signal by means of the "or" gate. Thus, we must perform switching operations with electrical pulses rather than D.C. states. Such operations are generally more power-consuming and more expensive than D.C. state operations. Furthermore, the process of differentiation in general tends to accentuate noise found anywhere in the system. This, of course, tends to make the system less reliable.

An object of this invention is to provide a circuit for rate multiplication which is more reliable, simpler, and less expensive than previously available circuitry.

Another object of this invention is to provide a rate multiplication circuit which does not require the use of differentiating networks.

Still another object of this invention is to provide a rate multiplication circuit in which all switching operations are performed with D.C. levels rather than pulses.

In accordance with the present invention, a control signal is formed by combining the time sequence of pulses with the contents of the static register. A signal source gate receives the time sequence of pulses and the control signal, and selects a certain number of pulses from the total number of pulses in the time sequence. The number of pulses so selected is the product of the number of pulses in said time sequence and said static register contents.

The foregoing statements are illustrative of the various aims and objects of this invention. Other objects and advantages will become apparent from a study of the following specification when considered in conjunction with the accompanying drawings, in which:

FIG. 1 is a schematic block diagram of the improved rate multiplier circuit of the present invention;

FIG. 3 is a circuit diagram illustrating the details of construction of a signal source as used in the circuit of this invention.

Figure 2:
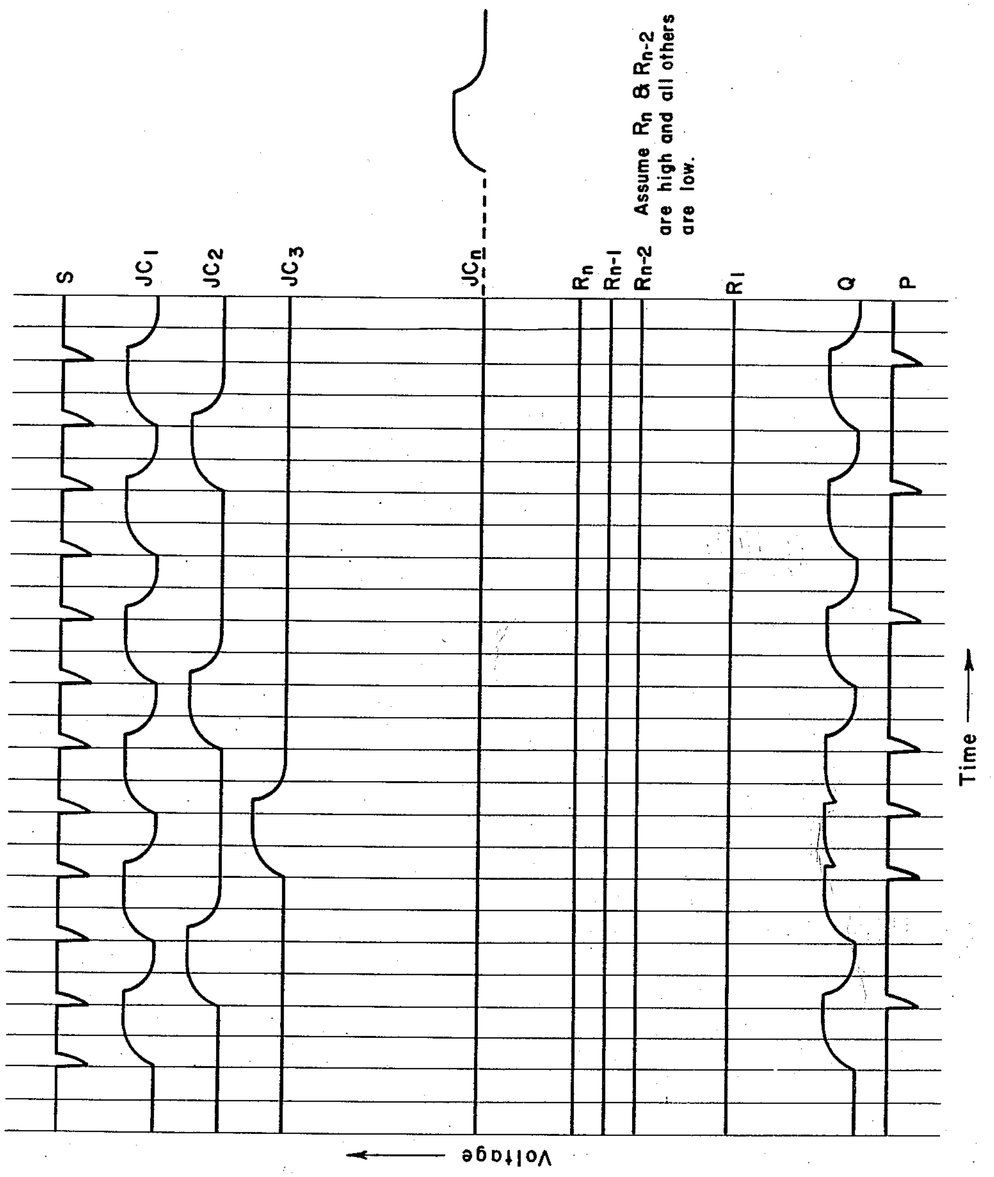
FIG. 2 is a graph of waveforms of signals appearing at various points of the circuit of FIG. 1.

Turning now to FIG. 1, there is illustrated a block 10 which represents a storage cell for a single binary digit. This cell may be a flip-flop, or any type of bistable device which has as its output a relatively high voltage to represent a binary 1 and a relatively low voltage to represent a binary 0. Blocks 10, 11, 12 and 13 represent a plurality of such cells forming a register. The register may consist of as many register cells as may be desired to store any number of required digits.

In FIG. 1, storage cell 10 stores the least significant digit of the binary number, and cell 13 stores the most significant digit of the binary number. The binary number stored in the register will be designated the multiplier. Blocks 14, 15, 16 and 17 represent another set of storage cells connected together to form a binary counter as will be described hereinafter. These storage cells may also be flip-flops or any other type of bistable devices. Storage cell 14 stores the least significant digit, and storage cell 17 the most significant digit. Each counter storage cell forming part of the binary counter receives as an input signal the output of a signal source 18 which produces a sequence of pulses whose number will be designated the multiplicand.

In this invention the circuit cells 14, 15, 16 and 17 are shown as flip-flops having two inputs. The first input (J) receives signals which direct the flip-flop to be set to a 1 state and a second input (K) receives signals which cause the flip-flop to be set to a 0 state. The output of register cell 10 is combined with the J input signal to the flip-flop 17 in an "and" gate 19. An "and" gate, as is well-known in the art, is a circuit which supplies an output signal when each input signal applied thereto is relatively high. The output of register cell 11 is similarly combined with the J input signal to the flip-flop 16 in an "and" gate 20. The output of register cell 12 is combined with the J input signal to the flip-flop 15 in an "and" gate 21, and the output of register cell 13 is combined with the J input signal to the flip-flop 14 in an "and" gate 22. The outputs of "and" gates 19, 20, 21, and 22 are combined in an "or" gate 23. The output of the "or" gate 23 is introduced to a signal source gate 24 which receives as another input signals from the signal source 18. The signal source gate 24, as will be explained hereinafter, supplies its output as a set of pulses which are impressed on a product counter 25.

The operation of the circuit of FIG. 1 will now be described.

The flip-flops 14, 15, 16 and 17 are interconnected (not shown) to form a binary counter schematically indicated by the dotted box 26. The equations defining these interconnections for the J and K inputs to each of said flip-flops follow:

$$JC_1=\overline{C_1}$$
$$KC_1=C_1$$
$$JC_2=\overline{C_2}C_1$$
$$KC_2=C_2C_1$$
$$JC_3=\overline{C_3}C_2C_1$$
$$KC_3=C_3C_2C_1$$
$$JC_n=\overline{C_n}C_{n-1}\ldots C_3C_2C_1$$
$$KC_n=C_nC_{n-1}\ldots C_3C_2C_1$$

in which:

$C_1$ designates a 1 condition of the flip-flop 14
$\overline{C_1}$ designates a 0 condition of the flip-flop 14
$C_2$ designates a 1 condition of the flip-flop 15
$\overline{C_2}$ designates a 0 condition of the flip-flop 15
$C_3$ designates a 1 condition of the flip-flop 16
$\overline{C_3}$ designates a 0 condition of the flip-flop 16
$C_n$ designates a 1 condition of the flip-flop 17
$\overline{C_n}$ designates a 0 condition of the flip-flop 17
S designates a signal from the signal source 18.

Each of the equations above must also be combined in an "and" gate with the signal S. As is common practice, a separate "and" gate forming part of the flip-flop circuit is used for this purpose.

The equations are well-known in the art for producing a binary counter in which the output of the cells forming the counter assume a different configuration for each total number of pulses introduced to the counter.

The switching operations described by the above equations may be performed by a variety of different circuits including diode networks, vacuum tube gates, relay gates, etc., all of which are well-known in the art. It is immaterial for the purpose of this invention which type of switching circuit is chosen, since all are equally applicable.

In FIG. 2, there are illustrated the signals appearing at various points on the circuit diagram of FIG. 1 in which the abscissa represents time and the ordinate represents voltage. The signal S is taken at the output of the signal source 18. The signal $JC_1$ is taken at the J input of the flip-flop 14, and, as shown, is relatively high during every second S pulse. The signal $JC_2$ is taken at the J input of the flip-flop 15 and is relatively high during every fourth S pulse; the signal $JC_3$ is taken at the J input of the flip-flop 16 and is relatively high during every eighth S pulse; the signal $JC_n$ is taken at the J input of the flip-flop 17 and is relatively high during the occurrence of every $2^n$th S pulse. The signals $R_1$, $R_{n-2}$, $R_{n-1}$, and $R_n$ are taken at the outputs of the register cells 10, 11, 12, and 13, respectively. Each of these signals remains in its voltage state (relatively high or low) throughout the operation. In FIG. 2, $R_n$ and $R_{n-2}$ are assumed to be relatively high and all other register cell outputs are assumed to be relatively low. The signals Q and P are also shown in FIG. 2 and will be explained hereinafter. The signals $JC_1$, $JC_2$, $JC_3$ and $JC_n$ are taken at the J inputs of the flip-flops 14, 15, 16, and 17 before the addition of the S signals. It is these signals which are combined with the outputs $R_1 \ldots R_n$ of the register storage cells 13, 12, 11, and 10, respectively, in "and" gates 22, 21, 20, and 19. The function Q which forms the output of "or" gate 23 is given by the equation below and shown in FIG. 2 for a particular register combination.

$$Q=R_nJC_1+R_{n-1}JC_2+R_{n-2}JC_3+\ldots+R_1JC_n$$

in which:

Q designates the output signal from the "or" gate 23
$R_1$ designates the output signal from the register cell 10
$R_2$ designates the output signal from the register cell 11
$R_3$ designates the output signal from the register cell 12
$R_n$ designates the output signal from the register cell 13 and
$JC_1$, $JC_2$, $JC_3$, and $JC_n$ have already been defined.

The signal source gate 24 combines the output from the "or" gate 23 with the S signal as shown in FIG. 1, such that the pulses forming the S signal will be transmitted to output of the signal source gate 24 (P) when Q is high and will not be transmitted when Q is low. The signal P forms the input to the product counter 25 which may be any desired type of counter, such as a binary or a decimal counter, which indicates the total number of pulses forming the P signal.

In FIG. 3, a detailed construction of the signal source gate 24 of FIG. 1 is shown. The output Q of the "or" gate 23 in FIG. 1 is impressed on the base of a P–N–P transistor 31 through a current limiting resistor 32. A speed-up capacitor 33 is connected across the resistor 32. The base of the transistor 31 is also connected to a source of positive voltage B+ through a voltage-dropping resistor 34. The emitter of the transistor 31 is connected to ground. The signal source 18 (S) is applied to the collector of the transistor 31 through a load resistor 35. The output of the gate is also taken from the collector. The operation of the signal source gate is described below.

Assuming that the signals from the "or" gate 23 and the signal source 18 have values of either 0 or −6 volts. When the signal from the "or" gate 23 is at 0 volts, the circuit parameters are chosen such that the P–N–P transistor 31 is cut off so that no current flow occurs between the emitter and collector of the transistor. Thus, the output lead is free to follow the voltage alternations of the signal source 18. When the voltage input from the "or" gate 23 is −6 volts sufficient current flows between the emitter and collector of transistor 31 so that the transistor is saturated. Thus, the collector will be held at approximately ground potential and negative pulses from signal source 18 will not affect the output of the transistor 31. In this way, the signal source gate 24 effectively inhibits the transmission of such pulses. Resistor 35 is the load resistor and also serves to limit the current flowing through the transistor 31. Resistors 32 and 34 in combination serve to protect the transistor against overload when the transistor is conducting, since the relative resistor values and the assigned voltage levels are selected to establish the proper voltage at the base of the transistor. These selected resistor values also provide assurance that signals within a certain range about ground potential will cut off the flow of current through the transistor 31. The capacitor 33 serves as a normal speed-up capacitor in that it passes a transient current from the "or" gate 23 before the resistor 32 is fully conducting and thus enables faster operation of the transistor.

The operation of the rate multiplier circuit is as follows:

A control signal Q is generated to operate on the train of pulses from the signal source S, such that the pulses forming the signal S are only permitted to pass the signal source gate 24 in accordance with the states of the binary counter cells and the register cells. The signal Q is not directly made up of pulses, as in the prior art, but is rather a D.C. control signal. Thus, in accordance with this invention there are combined only D.C. levels and pulses at a single gate, the signal source gate 24, and all gating necessary to form the signal Q is accomplished with D.C. levels rather than with pulses. For example, the output of register cell 13 is combined with the J input to the flip-flop 14; the output of register cell 12 is combined with the J input to the flip-flop 15. Similarly, the output of register cell 11 is combined with the J input to the flip-flop 16, and the output of register cell 10 is combined with the J input to the flip-flop 17. All of these signals are D.C. levels and not pulses. The combination signals derived from "and" gates 22, 21, 20, and 19, respectively, each of which is a D.C. level, are, in turn, combined in the "or" gate 23 which has a D.C. output signal Q. The concept of forming D.C. control signals as taught by this invention also eliminates the problem of simultaneously occurring pulses since the high state of the J signals making up the control signal never occur simultaneously and since the control signal operates on all of the pulses as they are received in time in a single pulse train S.

There has thus been described a circuit for rate multiplication which is more reliable, simpler and less expensive than previously available circuitry in that no differentiating circuitry is necessary and in that all gating is accomplished by D.C. levels.

What is claimed is:

1. A rate multiplier comprising a register for receiving and storing binary signals representative of a number designated the multiplier and for developing register signals indicative of the multiplier, a source of electrical pulses, the number of said pulses being representative in quantity of a number designated the multiplicand, control signal generating means coupled to said register and to said pulse source and responsive to said register signals and to the number of said electrical pulses for providing control signals, gating means coupled to said control signal generating means and to said pulse source and responsive to said control signals and to said pulses for passing selected ones of said pulses in accordance with said control signals, whereby the number of pulses so passed is representative of the product of said multiplier and said multiplicand.

2. A rate multiplier comprising a first plurality of bistable elements providing a register for receiving and storing binary signals representative of a number designated the multiplier and for developing register signals indicative of the multiplier, a source of electrical pulses, the number of said pulses being representative of a number designated the multiplicand, a second plurality of bistable elements interconnected to provide a binary counter and coupled to said pulse source for receiving said pulses and for developing a unique set of electrical voltages for each quantity of pulses received, a plurality of "and" gates coupled to said first plurality of bistable elements and to said second plurality of bistable elements and responsive to said voltage sets and register signals, an "or" gate coupled to said "and" gates for providing control signals representative of a function of said register signals and said pulses, gating means coupled to said "or" gate and to said pulse source and responsive to said control signals and to said pulses for passing selected ones of said pulses in accordance with said control signals, whereby the number of pulses so passed is representative of the product of said multiplier and said multiplicand.

3. A rate multiplier according to claim 2 in which each of said "and" gates is coupled to one of said first plurality of bistable elements and to an associated one of said second plurality of bistable elements and in which each of said "and" gates is coupled to a different set of one of said first plurality and of an associated one of said second plurality of bistable elements.

4. A rate multiplier comprising a plurality of first binary storage elements for receiving and storing binary signals each having a different order of least significance to most significance to represent a number designated the multiplier, a source of pulses, the number of said pulses being representative in quantity of a number designated the multiplicand, a plurality of second binary storage elements interconnected to provide a binary counter for storing binary signals representative of a counter number with the binary storage elements each having a different order of most significance to least significance, each of said second plurality of binary storage elements coupled to said source of pulses for changing the counter number in response thereto and each having an input terminal, a plurality of "and" gates with each "and" gate coupled to a different one of the plurality of first binary storage elements from the least order of significance to the most order of significance, and respectively in the same sequence to the input terminal of a different one of the secondary binary storage elements from the most order of significance to the least order of significance, said "and" gates forming control signals, and a pulse source gate coupled to said plurality of "and" gates and to said source of pulses for passing selected ones of said pulses in response to control signals from said "and" gates, whereby the number of pulses so passed is representative of the product of said multiplier and said multiplicand.

5. A rate multiplier comprising a plurality of first binary storage elements for storing binary signals with each first storage element storing a binary digit with a different order of significance from a least significant digit to a most significant digit to represent a multiplier, a source of pulses, the number of said pulses being representative in quantity of a number designated the multiplicand, a plurality of second binary storage elements interconnected to form a binary counter with each second binary storage element storing binary digits of a different order of significance of a binary count from a most significant digit to a least significant digit, each of said second binary storage elements having an input terminal, said second binary storage elements coupled to said source of pulses to count in response thereto, a plurality of "and" gates with each "and" gate coupled to a different one of said first binary storage elements storing binary digits from the least significant digit to the most significant digit, and respectively in the same sequence to the input terminal of a different one of said second binary storage elements respectively storing binary digits from the most significant digit to the least significant digit, an "or" gate coupled to said plurality of "and" gates, and a pulse control gate coupled to said "or" gate and to said source of pulses for passing selected ones of said pulses in accordance with signals applied through said "or" gate from said plurality of "and" gates, whereby the number of pulses so passed is representative of the product of said multiplier and said multiplicand.

6. A rate multiplier comprising a register including a plurality of first bistable elements for storing binary signals and each having a different order of significance from least significance to most significance representative of a number designated the multiplier and for developing a plurality of continuous direct current signals indicative of the multiplier, a source of pulses for forming a plurality of pulses having a selected time interval therebetween, the number of said pulses being representative in quantity of a number designated the multiplicand, a counter having a plurality of second bistable elements each having input and output terminals interconnected to form a counter having a binary count, each of said second bistable element storing signals having a different order of significance in said count from most significance to least significance, said plurality of second bistable elements each coupled to said source of pulses for changing the binary count stored in said plurality of second bistable elements in response thereto, said input terminals each having selected counter control signals thereat substantially during each of said time intervals, a plurality of "and" gates each coupled to a different one of the plurality of said first bistable elements storing signals from the least order of significance to the most order of significance, and respectively in the same sequence to the input terminal of a different one of said second bistable elements storing signals from the most order of significance to the least order of significance, an "or" gate coupled to said plurality of "and" gates, and a pulse gate coupled to said "or" gate and to said source of pulses for passing selected ones of said pulses in response to signals applied from said "and" gates through said "or" gate, whereby the number of pulses so passed is representative of the product of said multiplier and said multiplicand.

References Cited in the file of this patent

UNITED STATES PATENTS

| | | |
|---|---|---|
| 2,910,237 | Meyer et al. | Oct. 27, 1959 |
| 2,913,179 | Gordon | Nov. 17, 1959 |
| 2,926,848 | Gordon | Mar. 1, 1960 |

OTHER REFERENCES

Computer Development (Seac and Dyseac), at the National Bureau of Standards, U.S. Dept. of Commerce, NBS Circular 551 (1955), p. 76, FIG. 7.